Nov. 6, 1956 P. A. HAUCK 2,769,519
TRANSFER MECHANISMS
Filed July 14, 1954 5 Sheets-Sheet 2

INVENTOR.
PAUL A. HAUCK
BY
ATTORNEYS

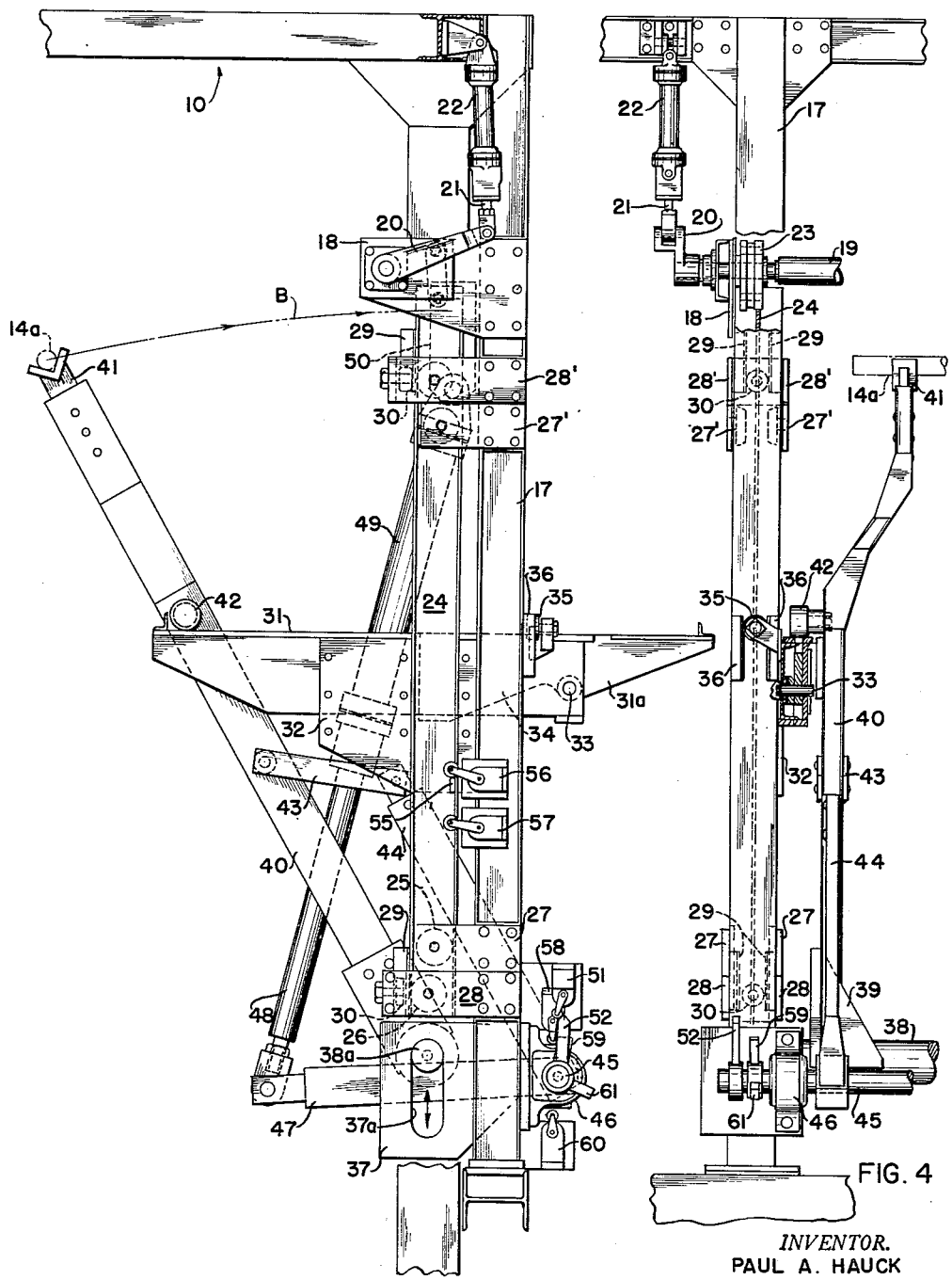

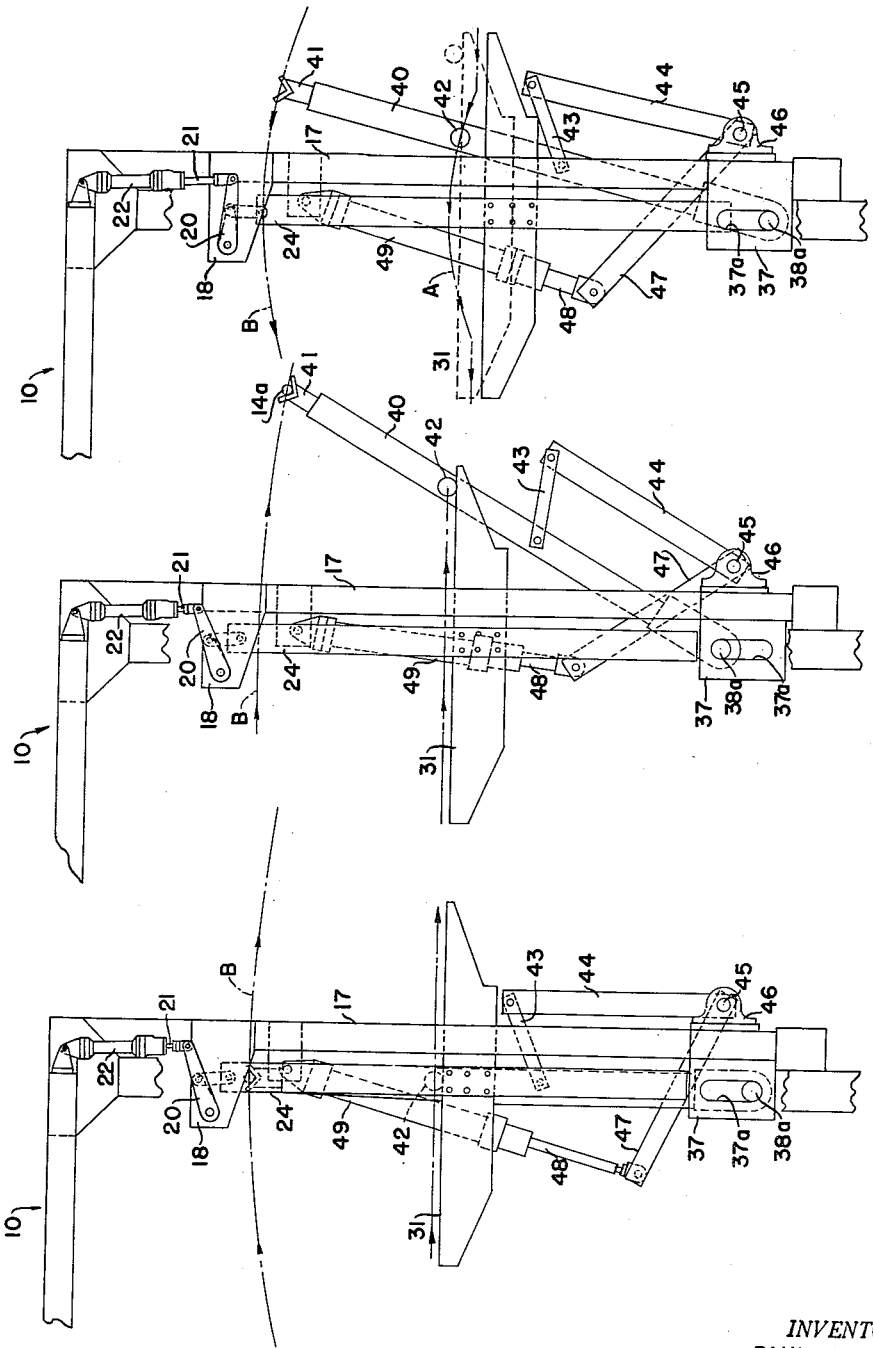

Nov. 6, 1956

P. A. HAUCK 2,769,519

TRANSFER MECHANISMS

Filed July 14, 1954

INVENTOR.
PAUL A. HAUCK

BY
Pennie Edmonds Morton Barrows Taylor

ATTORNEYS

United States Patent Office 2,769,519
Patented Nov. 6, 1956

2,769,519

TRANSFER MECHANISMS

Paul A. Hauck, Union, N. J., assignor to Hanson-Van Winkle-Munning Company, Matawan, N. J., a corporation of New Jersey Application July 14, 1954, Serial No. 443,193

11 Claims. (Cl. 198—21)

This invention relates to conveying systems of the type, on which the articles being conveyed are supported on carriers, and is concerned more particularly with a novel transfer mechanism, by which article carriers can be removed from one conveyor and delivered to another. The new mechanism provides a simple effective transfer apparatus, which can be brought into operation by the first conveyor, as an article carrier thereon approaches the transfer station, and the apparatus then performs its functions cyclically and comes to rest in position for the next operation. The mechanism of the invention is especially adapted for transferring article carriers between the conveyor of a processing machine, in which the articles are given various treatments, and a plant conveyor, by which the article carriers are delivered to or removed from the vicinity of the processing machine, and such an application of the transfer mechanism will be illustrated and described for purposes of explanation.

In the electroplating of various articles, such as automobile bumper bars, it is usual to employ an electroplating apparatus, which includes a plurality of tanks, a conveyor for moving racks carrying a number of the bars along the tanks step by step, and an elevator for raising and lowering the racks relative to the tanks. The racks of bars to be plated may be delivered to the apparatus by a plant conveyor and, when a rack has been conveyed through the apparatus, it is usually placed upon the plant conveyor and transported to a station for further treatment of the plated bars. As each rack carries a heavy load of the bars, it is desirable that the transfer of the racks from one conveyor to the other be carried on mechanically and the transfer mechanism should operate automatically and be brought into action, as a rack approaches the station where the mechanism is to remove the rack from one conveyor and deliver it to the other.

The invention is, accordingly, directed to the provision of a transfer mechanism, which will perform the functions stated and is simple in construction and reliable in operation. In the new mechanism, the actual transfer of the article carriers, such as the bumper bar racks, is effected by means of a pair of arms mounted for swinging movement and also shiftable vertically to pick up and deposit a carrier. The shifting movement of the arms is accomplished by providing each arm with a roller movable along a track mounted for vertical movement and, when the arms are at one end of their angular path, the tracks are raised to cause the arms to pick up a carrier from the first conveyor. The arms are then swung, while the tracks remain raised, and the loaded arms are supported during their swing by the tracks and not by their pivotal mountings. At the opposite end of the angular path of the arms, the tracks are lowered to cause the carrier to be deposited on the second conveyor, after which the arms are swung back with the tracks lowered. During part or all of the return movement, the tracks may be supported wholly in their pivotal mountings, but, since the arms are then unloaded, such action does not subject the mountings to heavy stresses and thus the arms and mountings need not be of unusually strong construction.

For a better understanding of the invention, reference may be made to the accompanying drawings, in which Fig. 1 is a side elevational view, with parts omitted, of the new transfer mechanism installed to transfer article carriers from a processing machine conveyor to a plant conveyor.

Figs. 3 and 4 are, respectively, side and end elevational views on an enlarged scale of the transfer mechanism;

Figures 8, 9:
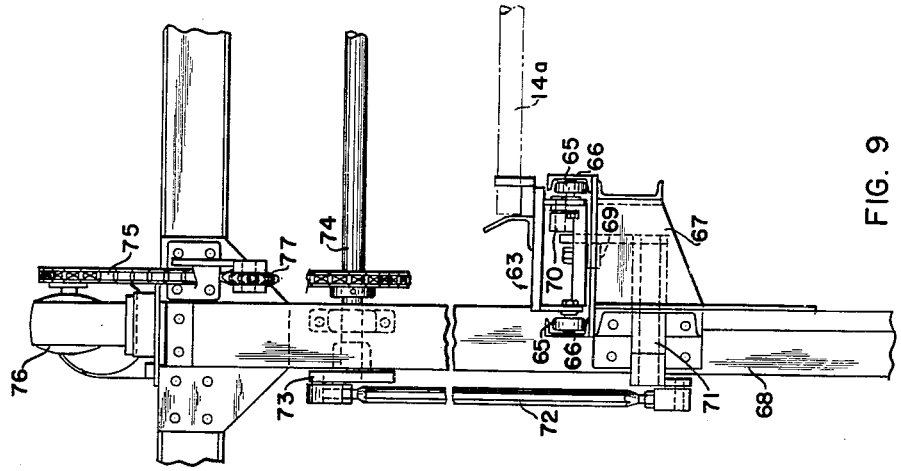

Figs. 5, 6, and 7 are diagrammatic side elevational views of the transfer mechanism at different stages in its operation; and Figs. 8 and 9 are, respectively, side and end elevational views of auxiliary transfer means for use with the transfer mechanism.

Figure 1:
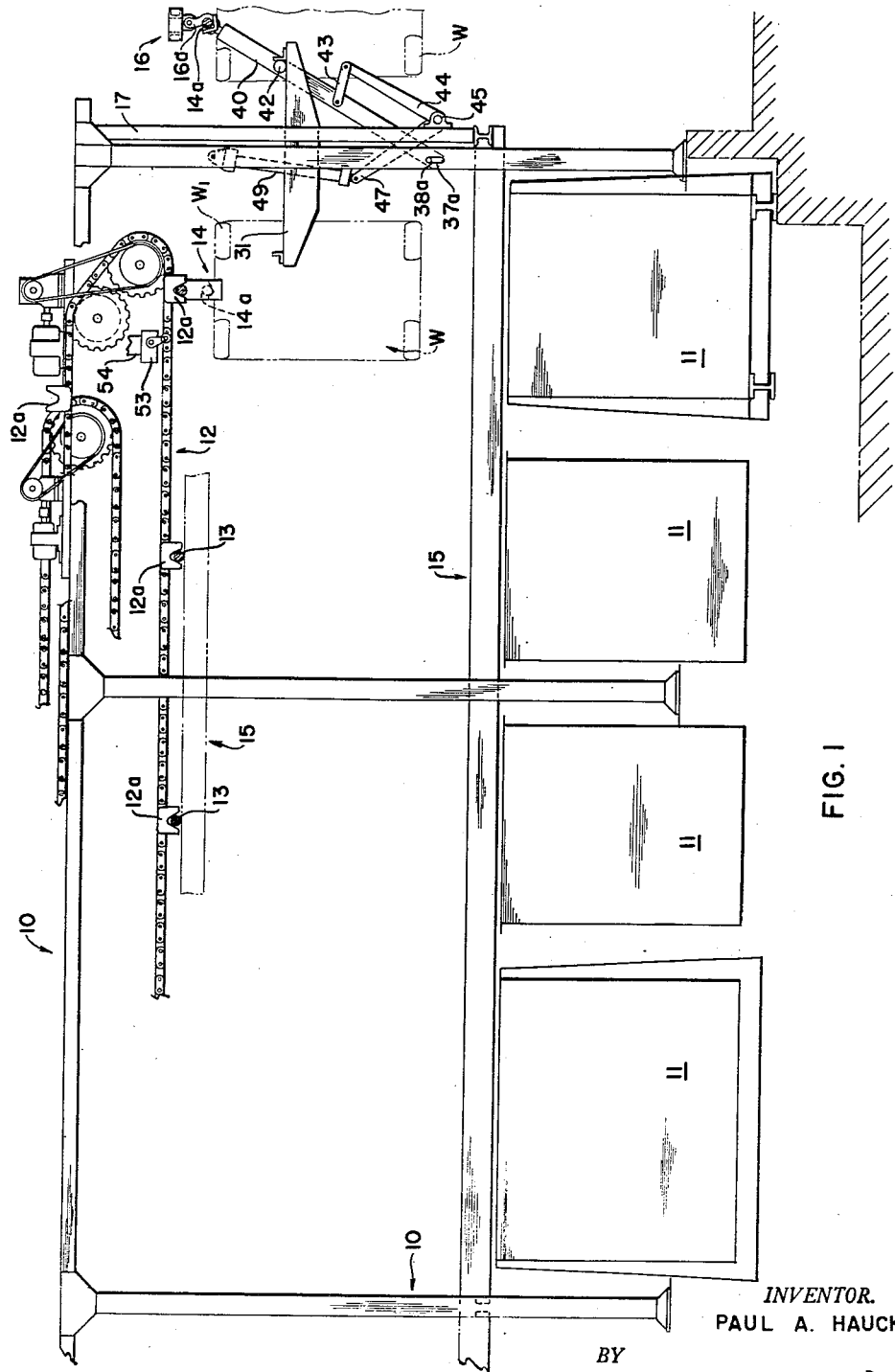
Figure 2:
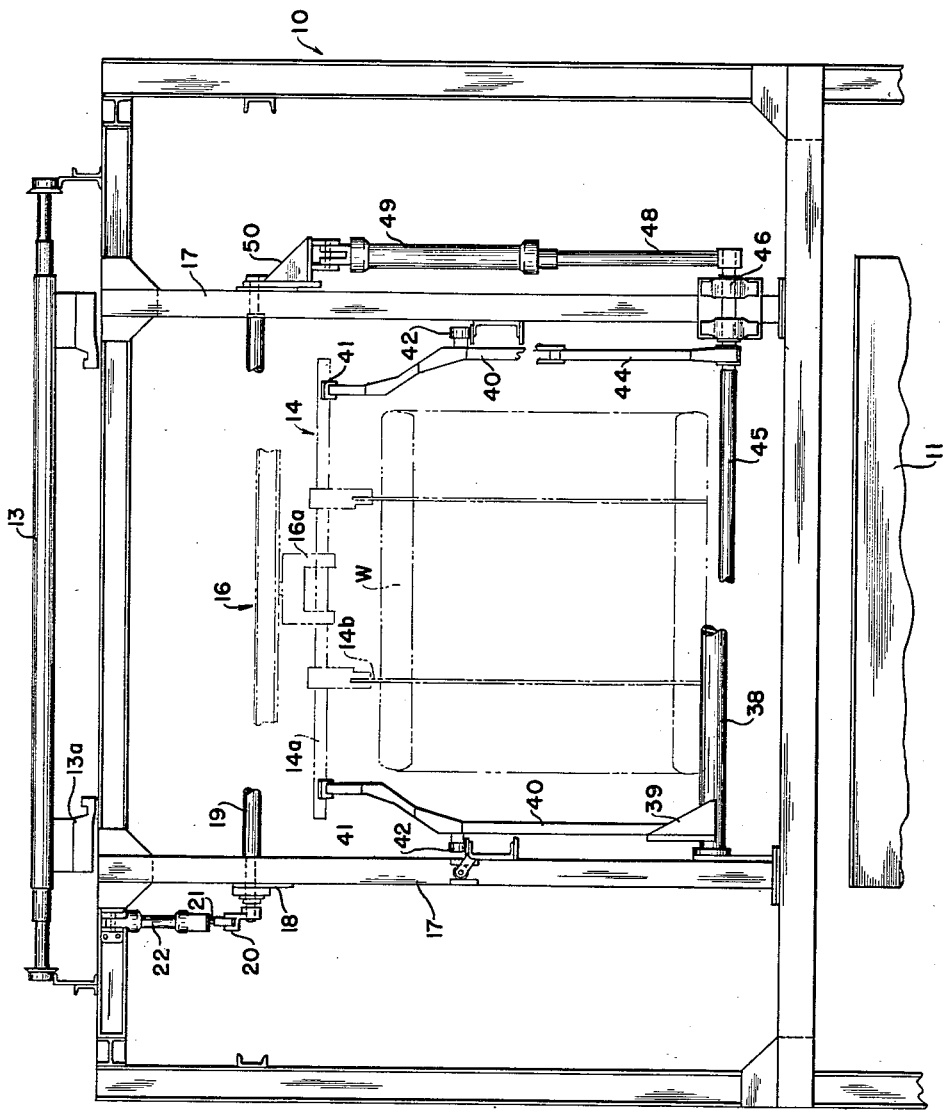
Fig. 2 is a view of the transfer mechanism in end elevation from the right of Fig. 1.

The processing machine, with which the new transfer mechanism is shown in use in Fig. 1, is of a well known type and comprises a main frame generally designated 10, a series of tanks 11, a conveyor 12 on the frame having yokes 12a for advancing carriages 13 supporting article carriers 14 along the tanks with a stepwise movement, and an elevator 15 on the frame for raising and lowering the carriages 13 to immerse the articles in and withdraw them from the solutions in the tanks. Each article carrier 14 has a top bar 14a and depending arms 14b, on which a number of the workpieces W, illustrated as automobile bumper bars, may be mounted in two vertical rows. The article carrier is supported on a carriage 13 by having the ends of its top bar 14a received in hooks 13a of the carriage and, in the installation shown, the transfer mechanism operates to engage and lift the top bar 14a of each article carrier free of the hooks 13a of a carriage and to transfer the carrier to a position, where a hook 16a on a plant conveyor generally designated 16 picks up the top bar 14a, so that the carrier is transported away from the processing machine.

The transfer mechanism includes a pair of spaced columns 17 secured to the frame 10 and carrying brackets 18 near their upper ends for supporting a rock shaft 19 having an arm 20, which is connected to a rod 21 attached to a piston within a hydraulic cylinder 22. The cylinder is of the conventional type and fluid can be supplied to either end and exhausted from the other by means of a remotely controllable valve to swing the arm 20 and thereby rock shaft 19. Shaft 19 is provided near each column 17 with an arm 23 connected to the upper end of a slide 24, which has channels in its front and rear faces receiving lower pairs of guide rollers 25, 26 engaging the opposite sides of the front and rear channels and mounted on brackets 27, 28 attached to the column. Each column has upper brackets 27', 28' carrying guide rollers like rollers 25, 26, which enter the channels in the slide. The slide is provided on one side with upper and lower pairs of spaced guides 29, which lie on opposite sides of guide rollers 30 on brackets 28 and 28'. The slide is vertically movable by cylinder 22 and is guided in its movements by rollers 25, 26 and 30.

Between its ends, each slide carries a track 31 secured thereto partly by a bracket 32. The track extends beyond the opposite sides of the slide and it has an end section 31a, which is pivoted to the main part of the track at 33 and is counter-weighted at 34, so that, when free to do so, the end section swings counter-clockwise to substantially vertical position and thus shortens the overall length of the track transversely of its slide. The main part of the track has a bracket carrying a roller 35 lying between spaced vertical guides 36 on the adjacent column 17 and helping to guide the slide in its movements.

A bracket 37 is attached to each column near its lower end and the brackets have vertical slots 37a receiving the journals 38a at the ends of a shaft 38. Near each end, the shaft carries an attachment 39, to which is secured an arm 40. Each arm may be made in two parts connected together to make possible variation in the length of the arm and, at its outer end, carries an angle seat 41. Each arm carries a roller 42 movable along the adjacent track 31 and each arm is connected by a link 43 to an arm 44 fast upon a shaft 45 journaled in bearings 46 on the columns 17 near their lower ends. Near one end, shaft 45 carries an arm 47 connected at its outer end to the rod 48 connected to the piston in a hydraulic cylinder 49 pivotally mounted on a bracket 50 attached to the adjacent column 17.

The transfer mechanism is operated cyclically and its operations can be controlled by conventional controls, which cause the cylinders 22 and 49 to function in the desired manner and sequence. In the mechanism illustrated, the cylinders are controlled by limit switches, relays, etc. A number of switches are used, as follows.

A switch 51 is mounted on a bracket attached to one of the columns 17 adjacent shaft 45 and the shaft has an arm 52 engageable with the operating arm of the switch to operate the switch. Switch 51 is in circuit with a switch 53 (Fig. 1), which is mounted on a bracket 54 on the frame 10. The operating arm of switch 53 is engaged and the switch is operated by each yoke 12a on conveyor 12 as a carriage being moved along the elevator by the yoke is approaching the plate, where the article carrier is to be removed from the carriage by the transfer mechanism. Switches 51 and 53 act to control the operation of cylinder 49.

The slide 24 carries a lug 55, which lies between the operating arms of a pair of switches 56, 57 mounted in spaced relation on one of the columns 17. The switches 56, 57 also control the operation of cylinder 49.

A switch 58 is mounted on the bracket with switch 51 and is operable by an arm 59 on shaft 45. A switch 60 is also mounted on a bracket on the column adjacent shaft 45 and is operable by an arm 61 on the shaft. Switches 58 and 60 control the operation of cylinder 22.

The circuits for controlling the cylinders 22 and 49 are such that, when switch 53 is not actuated by a yoke 12a on the conveyor, the actuation of switch 51 by arm 52 on shaft 45 stops the transfer mechanism with both cylinders inoperative. The position of arm 52 on shaft 45 is such that the transfer mechanism stops at the end of its cycle with arms 40 spaced a short distance from the limit of their counter-clockwise travel. When the next yoke 12a actuates switch 53, cylinder 49 is operated to swing the arms counter-clockwise and this movement continues until the arms 59 on shaft 45 operates switch 58. This stops the action of cylinder 49 and, at the same time, starts cylinder 22 in operation to raise the slides 24. The arms 40 are stopped with their seats 41 immediately below the top bar 14a of the article carrier on a carriage being advanced by a yoke, such as the yoke which actuated switch 53, and the raising of the slides and rails 31 causes the arms to move up, until the top bar of the carriage lies within their seats.

When the slides are raised by cylinder 22, the journals 38a on shaft 38, on which the arms are mounted, are moved upwardly in the slots 37a in brackets 37 on the columns, so that, when the loaded arms are swung clockwise by cylinder 49, the arms are supported only by engagement of their rollers 42 with the tracks 31. During such swinging of the arms, the journals 38a move down in the slots 37a and, when the arms reach the vertical position shown in Fig. 5, the journals are at the bottom of the slots. As the swinging of the arms continues, the journals begin to rise in slots 37a until, at the limit of clockwise travel of the arms, the journals have reached the top of slots 37a, as shown in Fig. 6.

At the extreme limit of their clockwise movement, the arms hold the top bar 14a of the article carrier supported in the arms in position to be engaged by a hook 16a on plant conveyor 16. The arms hold the top bar against the side of the hook and slightly above its bight, so that the article carrier can be transferred to the plant conveyor by lowering of the arms. This action is brought about by switch 60, which is operated by arm 61 on shaft 45 to stop the action of cylinder 49 and start cylinder 22 operating to lower the slides. As the slides move down, the top bar of the article carrier is seated in hook 16a and the slides and arms continue down, until lug 55 on one of the slides operates switch 57. This causes cylinder 22 to be put out of action and starts cylinder 49 swinging the arms counter-clockwise.

When the arms are lowered with the rails by the action of cylinder 22, the journals 38a move part way down the slots 37a and, when the arms are moved counter-clockwise, the rollers 42 start moving along tracks 31 and the journals move down in the slots, until they reach the bottoms of the slots. Farther movement of the arms causes them to swing about the axis of the journals as pivots located at the bottom of the slots and the rollers 42 on the arms rise from the tracks and follow the curved path A. During such movement of the arms with the rollers out of contact with the tracks, the arms are supported wholly by the journals seated at the bottoms of the slots, but as the arms are not loaded, no severe strains are imposed on the journals or the plates 37 having the slots. When the arms have reached the end of the curved path A, rollers 42 return to the tracks and, at about this time, the switch 51 is actuated by arm 52 on shaft 45 and cylinder 49 is put out of action. The cycle of operation of the transfer mechanism has thus been completed and the mechanism is in position to start another cycle when switch 53 is next actuated by a yoke 12a on conveyor 12.

It is to be noted that, with the construction described, the weight of the arms 40 with their load is supported by tracks 31 during the movement of the arms to deliver the load. Since the journals 38a on shaft 38 are free to move down through slots 37a during the swinging of the loaded arms, the path B of seats 41 on the arms is a flat arc on a radius substantially longer than the distance between a seat and the corresponding journal 38a. If the tracks were not employed and the load were supported wholly by the arms and shaft 38 with its journals seated in brackets 37, the construction would have to be extremely heavy and strong to withstand the strains imposed by the load. With the arrangement described, massive constructional features are not required.

Another advantage afforded by the construction described is that the flat path of travel of the seats 41 on the arms 40 prevents interference of the load with hooks 16a on the plant conveyor. It will be apparent from Fig. 1 that, if the arms 40 were mounted on fixed pivots at the top of slots 37a, the workpiece $W_1$ at the upper leading edge of a load on a carrier being transferred would strike the hook 16a as the arms approach the hook. By causing the arms to be supported on their rollers 42 running along the rails 31, the workpiece $W_1$ moves along a path passing beneath hook 16a and interference is thus avoided.

In some instances, the plant conveyor indicated at 62 may have hooks 62a opening away from the transfer mechanism, so that the top bar 14a of an article carrier cannot be deposited in a hook on the plant conveyor by the normal action of the transfer mechanism. When this situation is presented, the transfer mechanism is equipped with an auxiliary transfer device illustrated in Figs. 8 and 9.

The auxiliary device comprises a pair of shuttle carriages 63, each having a seat 64 at its top for receiving one end of the top bar 14a of an article carrier. Each carriage is provided with rollers 65 movable in channeled guides 66 mounted on a support 67. The supports are attached to respective columns 68, which are adjacent columns 17 and are spaced to permit the arms 40 of the transfer mechanism to pass between them. Each carriage may also be provided with a guide roller 69 movable in a slot in the top of its support 67. Each carriage is connected by linkage including link 70, a bell crank 71, and a link 72 to an eccentric pin on a disc 73 on a shaft 74 mounted for rotation in bearings on columns 68. The shaft is driven through a chain 75 by a motor 76 mounted on a convenient part of the frame and the chain is kept taut by an idler 77. A pair of switches 78, 79 are mounted on a bracket 80 at opposite sides of the disc 73 and have operating arms engageable by a lug 73a on the disc.

The auxiliary transfer device operates cyclically and, when the device is at rest at the end of a cycle, the carriages 63 are in their inner positions shown in full lines in Fig. 8. When the transfer mechanism functions and arms 40 move out to the limits of their clockwise travel, the top bar 14a of the rack being transferred lies immediately above the seats 64 on carriages 63 and, when the arms 40 are lowered, the bar enters the seats and the arms move down to free the bar and then swing counter-clockwise. At this stage, the bar 14a lies in the path of a hook 62a, which is being moved down by the plant conveyor to come to rest with its bight slightly below the top bar 14a in seats 64. As the hook approaches the top bar, a part of the conveyor engages the operating arm of a switch 81 mounted on a suitable support 82 and actuates the switch to start motor 76. The motor causes the carriages to be moved outward, so that the seats 64 reach the dotted line positions 64a (Fig. 8), where the bar 14a in the seats is out of the path of the descending hook 62a. As the carriages reach the outer end of their travel, switch 78 is actuated by lug 73a to reverse the motor and start the carriages moving inwardly. At this time, the hook 62a has been moved down and come to rest, so that the bar 14a in seats 64 on the carriages lies above the free end of the hook and in position to be picked up in the bight of the hook, when the hook rises. When the carriages have moved in to the desired position, the lug 73a on disc 73 actuates switch 79 and stops the motor. When the plant conveyor then rises, hook 62 picks up the bar 14a of the article carrier and the carrier is thus supported by the plant conveyor.

In the embodiment of the invention illustrated and described, the transfer mechanism transfers loaded article carriers to a plant conveyor 16, which has a path so close to the ends of rails 31, that, if the hooks on the conveyor moved horizontally instead of vertically, the carriers on the hooks would strike the adjacent ends of the rails. To avoid such interference and thus make possible the use of the transfer mechanism with a plant conveyor having horizontally moving hooks, the rails may be provided with end sections 31a, which are pivoted to swing in vertical planes and counterweighted to urge them to vertical position. When the rollers 42 on the arms 40 rest on sections 31a, the sections lie horizontal, but, when the load on the sections is removed, they swing upwardly out of the way of articles on carriers being transported on the plant conveyor. In Fig. 3, the end sections have been shown in alignment with the main sections of the tracks and as if held down by arms 40 supported thereby. It is to be understood that, when released, the sections are swung on pivots 33 to upright position by counterweights 34.

The new transfer mechanism in the specific form illustrated and described is for use in transferring loaded article carriers from a processing machine to a plant conveyor and the auxiliary transfer device shown is also for use for the same purpose. It is to be understood that the mechanism and device can be used equally well for transferring article carriers from a plant conveyor to a processing machine. Also, the loaded articles may be transferred in either direction, that is, with the arms swinging either clockwise or counter-clockwise, although, in both cases, the loaded arms are supported by their rollers resting on the rails, and, in the return movement of the unloaded arms, they are supported for part of their movement by their journals 38a at the bottom of slots 37a.

I claim:

1. A mechanism for transferring article carriers between stations, which comprises spaced vertical columns, a track mounted for movement on each column and extending transverse thereto, a pair of arms each connected at its lower end with one of the columns for swinging and vertical movement and having a roller movable along the track on said column, means on the arms for supporting a carrier, means for rocking the arms, means for raising and lowering the tracks, and control means for causing the rocking means and the raising and lowering means to operate in a repetitive transfer cycle.

2. A mechanism for transferring article carriers between stations, which comprises spaced vertical columns, a track mounted for movement on each column and extending transverse thereto, a pair of arms each connected at its lower end with one of the columns for swinging and vertical movement and having a roller movable along the track on said column, means on the arms for supporting a carrier, means for rocking the arms, means for raising and lowering the tracks, and control means causing the rocking means and the raising and lowering means to function in alternation in a cycle, in which the arms are swung in one direction while the tracks are at one end of their path of travel, the tracks are moved in one direction without swinging of the arms, the arms are swung in the opposite direction, while the tracks are at rest, and the tracks are moved in the opposite direction without swinging of the arms.

3. A mechanism for transferring article carriers between stations, which comprises spaced vertical columns, a track mounted for movement on each column and extending transverse thereto, a pair of arms each connected at its lower end with one of the columns for swinging and vertical movement and having a roller movable along the track on said column, means on the arms for supporting a carrier, fluid operated means for rocking the arms, fluid operated means for raising and lowering the tracks, and control means for causing the rocking means and the raising and lowering means to operate in a repetitive transfer cycle.

4. A mechanism for transferring article carriers between stations, which comprises spaced vertical columns, a track mounted for movement on each column and extending transverse thereto, a rock shaft mounted for rocking and vertical movement, a pair of arms fast on the rock shaft and extending upwardly therefrom, each arm having a roller movable along one of the tracks, means on the arms for supporting a carrier, means for rocking the rock shaft, means for raising and lowering the tracks, and control means for causing the rocking means and the raising and lowering means to operate in a repetitive transfer cycle.

5. A mechanism for transferring article carriers between stations, which comprises spaced vertical columns, a slide mounted on each column for movement along the column, a track attached to each slide and extending generally horizontally, a pair of arms each connected at its lower end with one of the columns for swinging and vertical movement and having a roller movable along the track on said column, means on the arms for supporting a carrier, means for rocking the arms, means for raising and lowering the slides in unison, and control means for causing the rocking means and the raising and lowering means to operate in a repetitive transfer cycle.

6. A mechanism for transferring article carriers between stations, which comprises spaced vertical columns, a rock shaft mounted in bearings on the columns, a slide mounted on each column for movement along the column, a track mounted on each slide and extending generally horizontally, a pair of arms each mounted at its lower end on one of the columns for rocking and vertical movement and having a roller movable along the track on the slide on said column, connections between the rock shaft and each slide, means on the arms for supporting a carrier, means for rocking the arms, means for rocking the rock shaft to raise and lower the slides and tracks, and control means for causing the means for rocking the arms and the means for rocking the rock shaft to operate in a repetitive transfer cycle.

7. A mechanism for transferring article carriers between stations, which comprises spaced vertical columns, a track mounted for movement on each column and extending transverse to the column, the tracks having pivotally mounted end sections at the same side of the columns biased to swing to shorten the overall length of the tracks, a pair of arms mounted on respective columns for rocking and vertical movement and having rollers movable along the tracks on said columns, means on the arms for supporting a carrier, means for rocking the arms, means for raising and lowering the tracks, and control means for causing the rocking means and the raising and lowering means to operate in a repetitive transfer cycle.

8. A mechanism for transferring article carriers between stations on a pair of conveyors, which comprises spaced vertical columns, tracks mounted for movement on respective columns and extending transverse thereto, a pair of arms mounted on respective columns for rocking and vertical movement and having rollers movable along the tracks on said columns, means on the arms for supporting a carrier, means for rocking the arms, means for raising and lowering the tracks, control means for the rocking means and the raising and lowering means causing the rocking means and the raising means to function in alternation in a transfer cycle, and means actuated by one of the conveyors for causing the control means to start the rocking means.

9. A mechanism for transferring article carriers between stations on a pair of conveyors, which comprises spaced vertical columns, a track mounted for movement on each column and extending transverse thereto, a pair of arms mounted for swinging and vertical movement on respective columns and having rollers movable along the tracks on said columns, means on the arms for supporting a carrier, means for rocking the arms, means for raising and lowering the tracks, control means for causing the raising and lowering means to operate in a repetitive transfer cycle, a pair of carriages mounted for horizontal movement from one end of the path of rocking movement of the arms, means on the carriages for receiving a carrier from the arms, and means for reciprocating the carriages in unison.

10. A mechanism for transferring article carriers between stations on a pair of conveyors, which comprises spaced vertical columns, a track mounted for movement on each column and extending transverse thereto, a pair of arms mounted for swinging and vertical movement on respective columns and having rollers movable along the tracks on said columns, means on the arms for supporting a carrier, means for rocking the arms, means for raising and lowering the tracks, control means for causing the raising and lowering means to operate in a repetitive transfer cycle, a pair of carriages mounted for horizontal movement from one end of the path of rocking movement of the arms, means on the carriages for receiving a carrier from the arms, means for reciprocating the carriages in unison in a cycle, in which the carriages make a complete reciprocation, and control means actuated by one of the conveyors for starting the reciprocating means.

11. A mechanism for transferring article carriers between stations, which comprises a pair of arms extending in an upward direction and having pivots near their lower ends and rollers spaced upwardly from the pivots, seats for the pivots, means on the arms for supporting a carrier, means for rocking the arms, a pair of horizontal tracks engageable with the rollers on the arms, means for raising and lowering the tracks, the tracks in their raised position engaging the rollers and lifting the arms to move the pivots from their seats, and control means for causing the rocking means and the raising and lowering means to operate in a repetitive transfer cycle.

References Cited in the file of this patent
UNITED STATES PATENTS

| | | |
|---|---|---|
| 1,479,809 | Headley et al. | Jan. 8, 1924 |
| 2,645,186 | Davis | July 14, 1953 |